United States Patent [19]
Martinez et al.

[11] Patent Number: 5,790,782
[45] Date of Patent: Aug. 4, 1998

[54] AUTOMATIC DISK DRIVE SHELF ADDRESS ASSIGNMENT AND ERROR DETECTION METHOD AND APPARATUS

[75] Inventors: Reuben Martinez; Timothy Lieber, both of Colorado Springs, Colo.

[73] Assignee: Digital Equipment Corporation, Maynard, Mass.

[21] Appl. No.: 746,739

[22] Filed: Nov. 15, 1996

[51] Int. Cl.[6] .................................................. G06F 11/00
[52] U.S. Cl. ......................... 395/185.06; 395/421.07
[58] Field of Search ................. 395/185.06, 185.01, 395/185.07, 185.1, 185.08, 182.03, 182.04, 183.18, 421.07, 421.08, 421.09, 441; 365/230.01, 230.09, 239; 369/75.1

[56] References Cited

U.S. PATENT DOCUMENTS

| | | | |
|---|---|---|---|
| 4,754,397 | 6/1988 | Varaiya et al. | 395/182.05 |
| 4,903,194 | 2/1990 | Houdek et al. | 395/185.06 |
| 4,974,156 | 11/1990 | Harding et al. | 395/441 |
| 5,471,600 | 11/1995 | Nakamoto | 395/421.09 |
| 5,555,390 | 9/1996 | Judd et al. | 395/421.07 |
| 5,586,250 | 12/1996 | Carbonneau et al. | 395/182.04 |
| 5,586,253 | 12/1996 | Green et al. | 395/185.06 |
| 5,659,698 | 8/1997 | Weng et al. | 395/421.07 |

OTHER PUBLICATIONS

Grant et al., "Address Generation For Array Access Based on Modulus M Counters", European Design Automation Conf., IEEE, pp. 118–122, 1991.

Primary Examiner—Robert W. Beausoliel, Jr.
Assistant Examiner—Joseph E. Palys
Attorney, Agent, or Firm—Arthur W. Fisher; Ronald C. Hudgens; Mary M. Steubing

[57] ABSTRACT

Automatic shelf-to-shelf address assignment is provided for a plurality of disk drive supporting shelves that are removably contained within a multi--shelf cabinet. Error detection apparatus detects failure in the automatic assignment of shelf addresses. An address input of shelf-N receives a shelf addressing voltage from shelf N+1. Shelf-N checks to ensure that the received shelf-N address voltage is within a correct range. Where-N now increases its shelf-N address by one and applies this incremented address to an address input of shelf-N+1. Accuracy of the shelf-N+1 address input is checked, as are the cable/connectors that connect shelf-N to shelf-N+1. ADC and ADC techniques are used, and operation of the automatic address assignment system is timed.

32 Claims, 7 Drawing Sheets

| CABLE 17 SHELF-TO-SHELF INPUT VOLTAGE | CABLE 17 SHELF-TO-SHELF OUTPUT VOLTAGE | TIMER 60 | INDICATION | CABLE 32 REPORT |
|---|---|---|---|---|
| > 0 VDC < 5 VDC | N+1 VDC | < 2 SEC | NORMAL CABINET 10 POWER ON, SHELF INTERCONNECTION OK, VALID SHELF N AND SHELF N+1, ADDRESSING | OK |
| N VOLTS | ≠ N+1 VDC | < 2 SEC | EMU 21, NEXT SHELF N+1, OR OUTPUT CABLE 17 BAD | ERROR |
| 5-VDC | ------ | > 2 SEC | EMU 21, PREVIOUS SHELF N-1, OR INPUT CABLE 17 BAD | ERROR |
| 0-VDC | ------ | > 2 SEC | EMU 21 PREVIUOS SHELF N-1, OR INPUT CABLE 17 BAD | ERROR |

*Fig. 7*

AUTOMATIC DISK DRIVE SHELF ADDRESS ASSIGNMENT AND ERROR DETECTION METHOD AND APPARATUS

BACKGROUND OF THE INVENTION

1. Field of the Invention:

This invention relates to the field of data processing, and more specifically to the automatic assignment of individual shelf addresses to all of the shelves that are within a multi-shelf cabinet, thereby enabling the disk drives that are held by each shelf to be addressed by one or more hosts, or data processors, using the combination of an automatically assigned shelf address and a individual disk drive address.

2. Description of the Related Art:

The use of relatively large and multi-shelf cabinets to physically hold a plurality of disk drives is known. In these prior arrangements, shelf addresses are either assigned manually, or they are not assigned at all. Manual shelf addressing is prone to human error, and it is time consuming. In addition, the manual assignment of cabinet shelf addresses become invalid each time the shelves are reconfigured.

Schemes that provide a form of automatic shelf addressing include the use of physical, or electrical interlocks at each cabinet position that is adapted to hold a shelf. These arrangements, however, are prone to mechanical/electrical failure, and no means is provided in the prior are to detect such failures.

As a result, a need remains in the art for an apparatus/method that operates not only to automatically assign logical or data processing shelf addresses, but that additionally automatically detects errors in the automatic assignment of shelf addresses.

SUMMARY OF THE INVENTION

The present invention provides an automatic, shelf-to-shelf, address assignment to a plurality of shelves that are contained in a multi-shelf cabinet.

In an embodiment of the invention, each shelf is automatically assigned a unique data processing address, each shelf holds eight physically individual disk drives, and a given disk drive is addressed using a combination of the assigned data processing shelf address and the data processing address of the given disk drive. The eight disk drives may be arranged, for example, in a RAID configuration Other cabinet configurations may include fifteen or more individual shelves.

Error detection apparatus detects a failure in the automatic assignment of shelf addresses. Checking apparatus validates the input/output (I/O) communication that occurs between the individual cabinet shelves.

A physical cabinet is provided having a plurality of physically individual and physically spaced shelves. Each shelf may contain a plurality of individually addressable disk drives. Each such shelf/disk drive has it its own unique data processing address that comprises a combination of the shelf address and the disk drive address.

In accordance with the invention, logical shelf addresses are assigned based upon the physical location of the shelves within the cabinet.

Each shelf includes an Environmental Monitor Unit (EMU) that is constructed and arranged in accordance with this invention. By way of the operation of an EMU, each shelf "N" is provided with the capacity to;

(1) - accepting an assigned data processing shelf address "N" from its prior shelf having an address of "N−1", (2) setting its own shelf address to the assigned value of "N", (3) incrementing its own shelf address by "1", to thereby produce the shelf address "N+1", and (4) transmitting the produced shelf address "N=1" to the next shelf.

The invention operates to detect;

(1) shelf addressing faults, (2) failed shelf address incrementing, and (3) invalid shelf address setting.

The invention also operates to detect shelf addressing faults that are caused by missing or bad interconnect cables. Fault detection of the shelf cable interconnection system is necessary to ensure that valid shelf addresses have been assigned. This function is particularly desirable when a large cabinet contains a plurality of individual shelves wherein a capability must be provided to locate and detect any shelf-to-shelf interconnect problem. The following interconnect problems and shelf addressing problems are examples;

(1) a shelf input-cable problem, (2) a shelf output-cable problem, (3) a shelf address increment problem, and (4) a previous shelf address problem.

The present invention provides automatic shelf address assignment every time the cabinet system is configured or reconfigured. In addition, the present invention validates the shelf address assignments and removes the opportunity for human error.

A true shelf physical location to shelf logical or data processing address is achieved because;

(1) an individual inter shelf cable is used only to attach two adjacent shelves, (2) the shelves are physically mounted into the cabinet in a physical sequence, for example, from the bottom up, from the top down, from right to left, or from left to right, and (3) shelf logical or data processing addresses are assigned to the shelves in this same sequential order, i.e. from the bottom up, from the top down, from right to left, or from left to right.

In order to further ensure reliability, two redundant apparatus provide the automatic disk drive shelf address assignment and error detection of the present invention.

An object of the present invention is to provide an automatic shelf addressing apparatus/method that includes error detection.

In an embodiment of the invention, a cabinet holds a plurality "M" of shelves (where the decimal number "M" is an integer). These shelves are physically arranged in a sequential order from shelf-1 to shelf-"M". The EMU of shelf-1 receives a first-shelf addressing analog DC input voltage; for example, having an analog magnitude that can be designated as "a". In this embodiment of the invention, the shelf-1 address voltage is in fact a first magnitude step "a" above the magnitude 0 VDC.

An EMU within this first shelf now checks to ensure that this its received first shelf address voltage (whose magnitude should be "a" VDC) is, in fact, within a correct analog voltage range that extends from a low value of "n" VDC to a high value of ("M" times "n") VDC. In an embodiment of the invention, this correct voltage range is generated by way of a precision 5 VDC (i.e., plus or a minus 0.02%) power supply, and in this case, the first-shelf-address voltage "n" is not within the correct range if it is found to be equal to either 0 VDC or 5 VDC, thereby providing an indication that an open-circuit or short-circuit has occurred in the analog cable/connector at the address input of shelf-1.

When it is found that the first-shelf-address voltage "a" is within the correct voltage range, then this analog shelf address voltage is converted to a digital shelf-1 address voltage by the use of an ADC. The resulting binary number is then used as the data processing address for shelf-1. An example of such a data processing address for the first shelf is binary "00001".

The EMU within shelf-1 now operates to increment this binary shelf-1 address by a binary one, i.e., to the binary value "00010", whereupon this incremented shelf address is converted to an analog voltage and applied to an address input to the second shelf for use as a shelf-2 data processing address.

In order to check the reliability of this analog shelf-2 address, the analog next shelf or shelf-2 address that was applied to the input of shelf-2 is now converted back to a binary number within the EMU of shelf-1. Within the EMU of shelf-, this binary and converted-back next shelf-2 address is compared to that EMU's incrementation of the binary shelf-1 address. If a compare is not found, an error in next shelf addressing is generated. In addition, this checking function operates to detect an open-circuit or a short-circuit within the analog cable/connectors that are used to connect shelf-1 to shelf-2.

The above apparatus/method operates sequentially at each individual one of the "M" shelves, thus providing an address for shelf-2 that is equal to an analog/digital magnitude of "2a", providing an address for shelf-3 that is equal to an analog/digital magnitude of "3a", - - - and providing an address for shelf-M that is equal to an analog/digital magnitude of "Ma".

As a feature of the invention, the above-described operation of the EMU that is located at each of the "M" shelves is timed. That is, an EMU timer is started when the addressing/error-detection process of the EMU starts, and if the EMU does not complete its above described process within the time period of the timer, an addressing error message is generated.

These and other objects, features and advantages of the invention will be apparent to those of skill in the art upon reference to the following detailed description, which description makes reference to the drawing.

BRIEF DESCRIPTION OF THE DRAWING

FIG. 7 is a truth table that shows the operation of the FIG. 6 EMU.

DESCRIPTION OF THE PREFERRED EMBODIMENT

Figure 1:
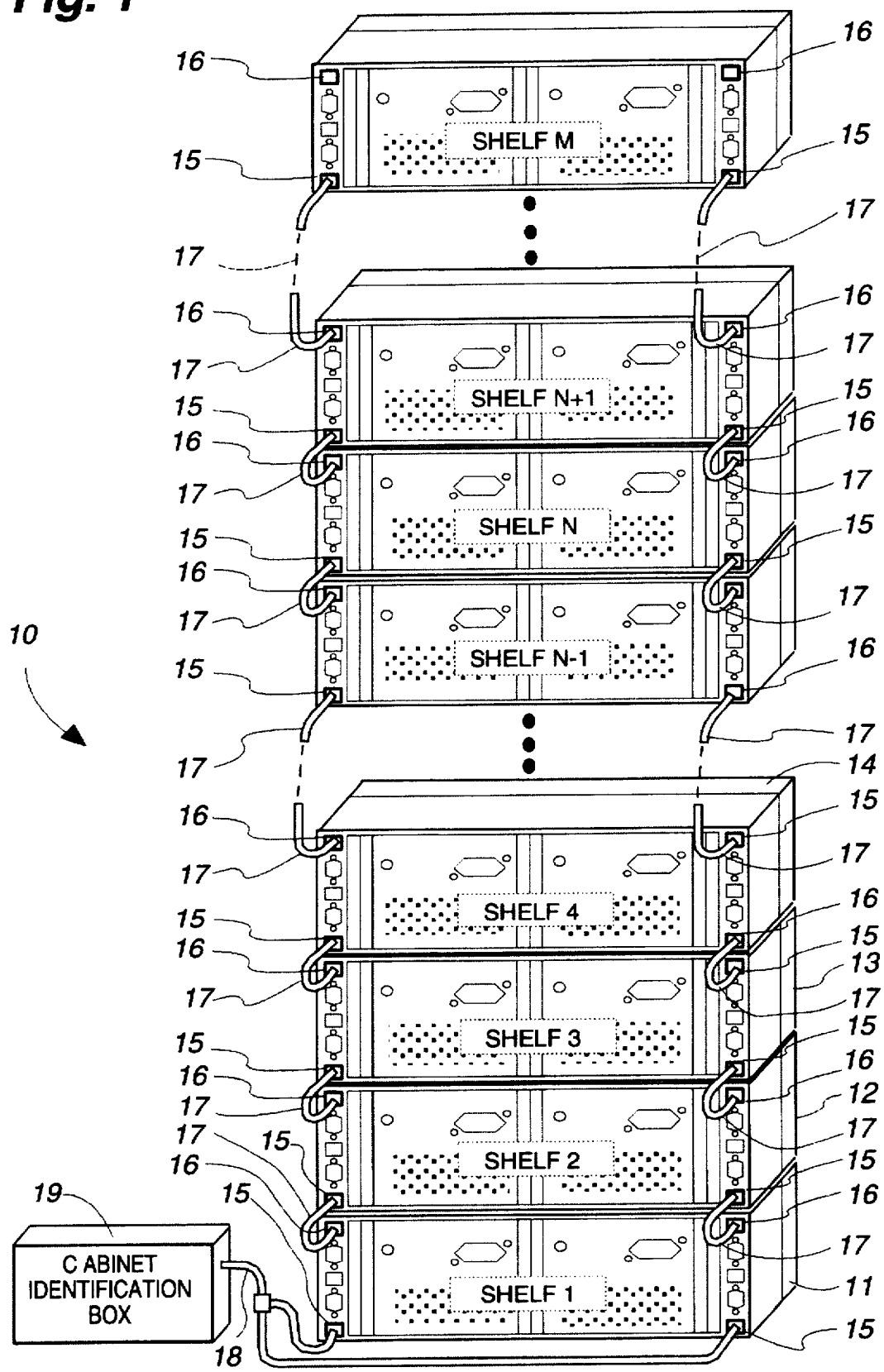
FIG. 1 is a front view of a vertically extending multi shelf cabinet in accordance with the invention, the cabinet having four shelves that are physically configured in a bottom-to-top sequential configuration, and wherein the cabinet is shown as being expandable to the number M of individual shelves.

FIG. 1 provides a front view of a vertically extending cabinet 10 having four shelves, i.e. shelf-1 identified by numeral 11, shelf-2 identified by numeral 12, shelf-3 identified by numeral 13, and shelf-4 identified by numeral 14. Note that in this nonlimiting example, the shelves are configured in a top-to-bottom physical/logical sequence configuration.

By way of dotted lines, FIG. 1 illustrates that cabinet 10 may include the number "M" of individual shelves, in which case a 3-shelf group "N–1", "N" and "N+1" is also provided.

Each shelf within cabinet 10 is provided with a pair of lower-disposed and redundant input-ports or connectors 15, and a pair of upper-disposed and redundant output ports or connectors 16. Note that the two upper output ports 16 of a lower shelf, for example shelf-2, are located closely adjacent to the two lower input ports 15 of the next adjacent shelf-3. As will be appreciated, ports 15 can also be called receiver ports, whereupon ports 16 would be called transmitter ports.

In accordance with a feature of this invention, the adjacent shelf ports 15,16 are connected by way of a short-length, 2-wire, cable 17 that prevents an inadvertent misconnection between the output port of a lower shelf and a port of another shelf. By way of example, cables 17 are about 6 inches long.

As seen in FIG. 1, the top shelf, be it shelf-4 or shelf-M, does not have a cable 17 connected to its top disposed redundant pair of output ports 1.

As will be apparent, the construction and arrangement of the present invention utilizes an analog voltage having a closely controller or precision magnitude that is received by the two input ports 15 of each shelf. In FIG. 1, the beginning shelf in the logical/physical sequence comprises bottom shelf-1, i.e. shelf 11, and this first shelf receives a precision-magnitude voltage from a cabinet identification (ID) box 19, by way of a conductor 18. Note that all other shelves within the cabinet receive this required analog and precision magnitude voltage from the output port 16 of the next lower shelf by way of an above described cable 17.

Figure 2:
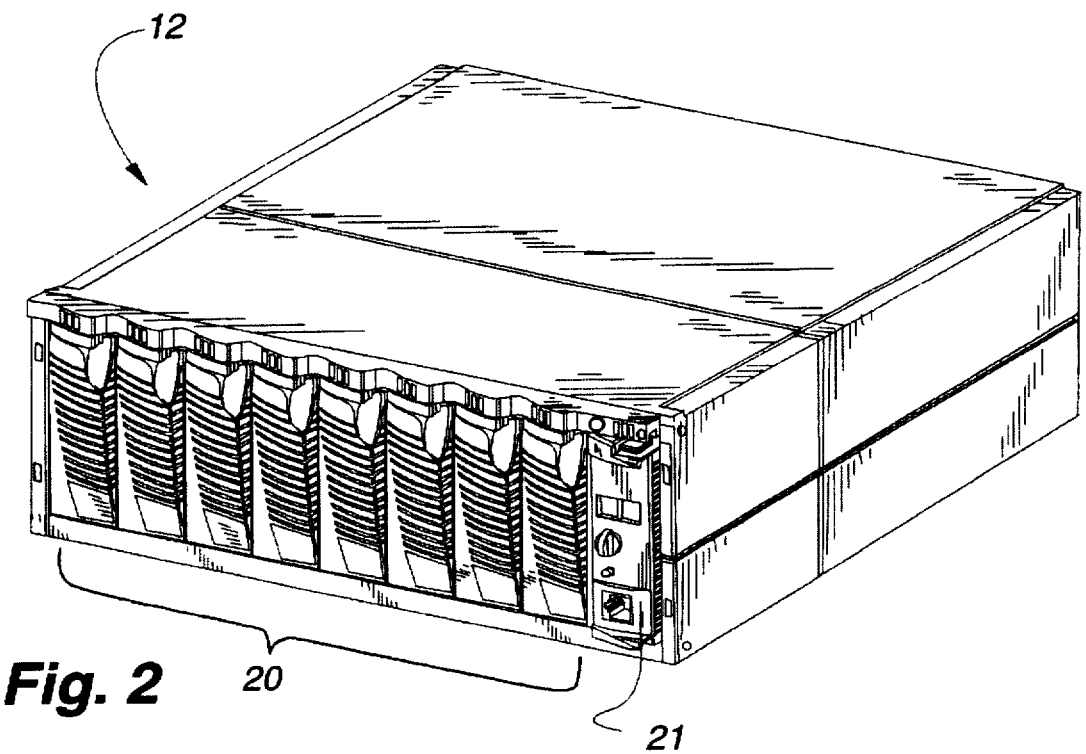
FIG. 2 is a top/front perspective view that shows one of the shelves of FIG. 1.
Figure 3:
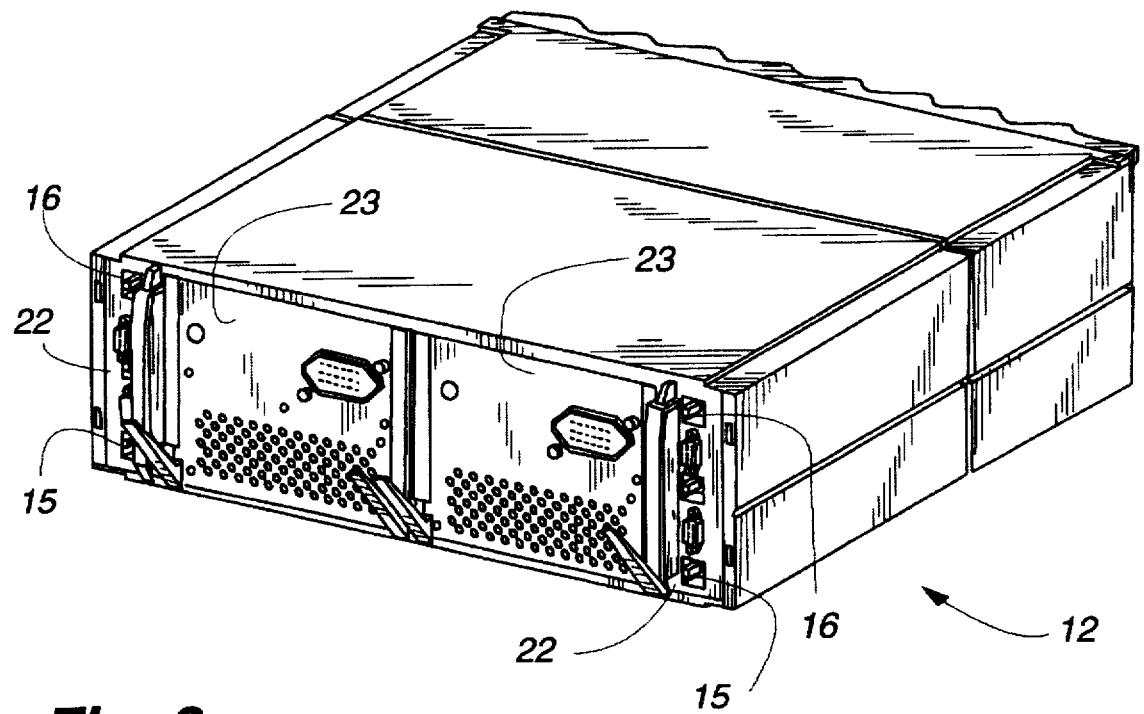
FIG. 3 is a top/rear perspective view of the shelf of FIG. 2.

All of the shelves of FIG. 1 are of generally and identical construction and arrangement. FIG. 2 is a top/front perspective view that shows one of the shelves, for example shelf-2 or shelf 12 of FIG. 1. FIG. 3 is a top/rear perspective view of shelf-2.

As shown in FIG. 2, each shelf includes eight physically individual disk drives that are individually and collectively identified as 20. As will be appreciated by those of skill in the art, when redundancy is provided as shown in FIG. 1, disk drives 20 are well known dual-ported disk drives.

Each shelf is also provided with an environmental-monitor-unit or EMU 21 that is constructed and arranged in accordance with this invention, as will be described later.

As seen from FIG. 3, each shelf includes a redundant pair of opposite end disposed input/output (I/O) modules 22 that include the above described input/output ports 15/16. A redundant pair of DC power supplies 23 are also provided to supply both 5-volt and 12-volt operating power to disk drives 20, and to supply 5-volt operating power to I/O modules 22 and EMU 21.

Figure 4:
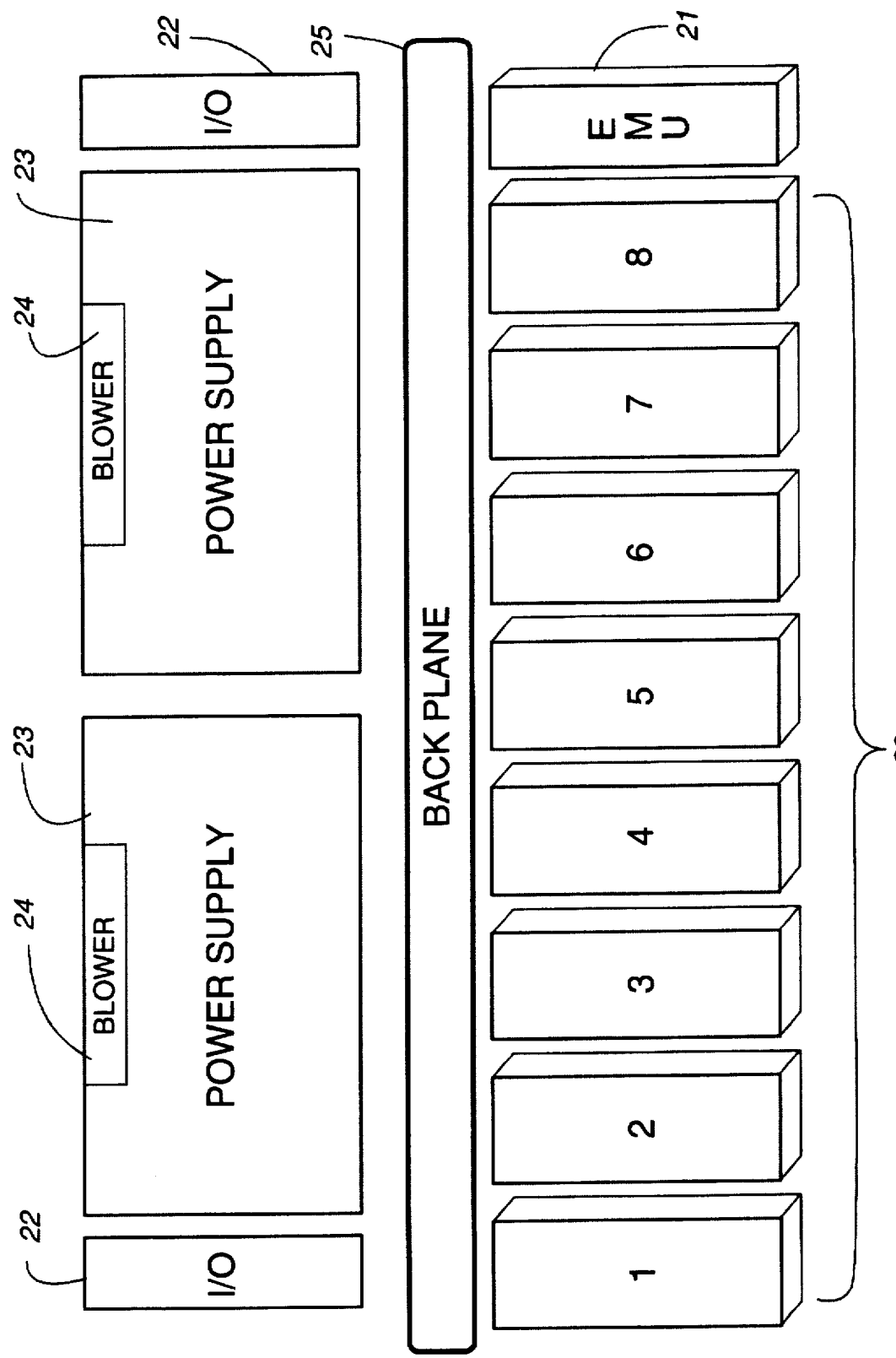
FIG. 4 is a top view block diagram of the FIG. 2,3 shelf.

As shown in the top block diagram view of FIG. 4, each shelf power supply 23 includes a cooling air blower 24, and the various components of each shelf are interconnected by way of a backplane member.

Figure 5:
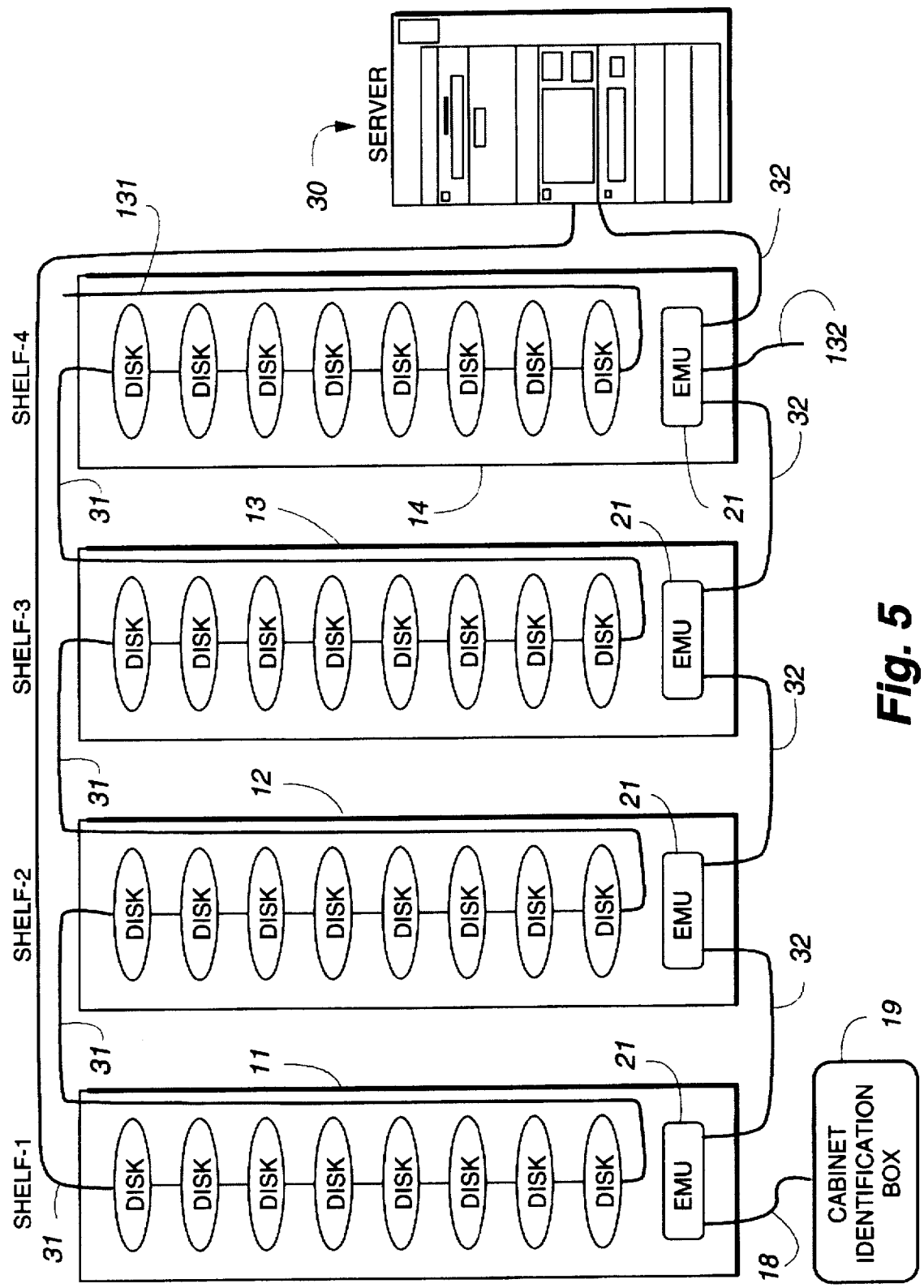
FIG. 5 provides a showing of the manner in which the four EMUs of the first four shelves (i.e., shelf-1 through shelf-4) of FIG. 1 are interconnected to a host or server 30 for the purpose of digital data processing, and for the automatic shelf addressing and error monitoring purposes in accordance with this invention.

FIG. 5 provides a showing of the manner in which the four EMUs 21 of the first four shelves 11–14 (i.e., shelf-1 - shelf-4) of FIG. 1 are interconnected to a host or server 30.

For digital data processing purposes, including individual shelf/disk drive data processing addressing, a bus or cable 31 interconnects all 32 disk drives 20 to server 30. Bus portion 131 connects shelf-4 to shelf-5 when such an additional shelf is present in cabinet 10. The data processing mode of operation may take a variety of forms, as is well known in the art, and will not be described herein. For example, the eight disk drives within an individual shelf may be configured as a RAID group of disk drives.

For the purposes of automatic shelf addressing and error monitoring in accordance with this invention, a bus or cable 32 interconnects all four shelf EMUs 21 to server 30. Cable portion 132 is used to connect the EMU of shelf-4 to shelf-5 when an additional shelf-5 is present in cabinet 10. As will be apparent from the following description, this reporting of a shelf address assignment error to server 30 comprises the detection by an EMU 21 that the magnitude of one of the analog/digital voltages that is used for the generation of a logical shelf address is out of an acceptable voltage range. This error reporting to server 30 can be called "out of band reporting".

Figure 6:
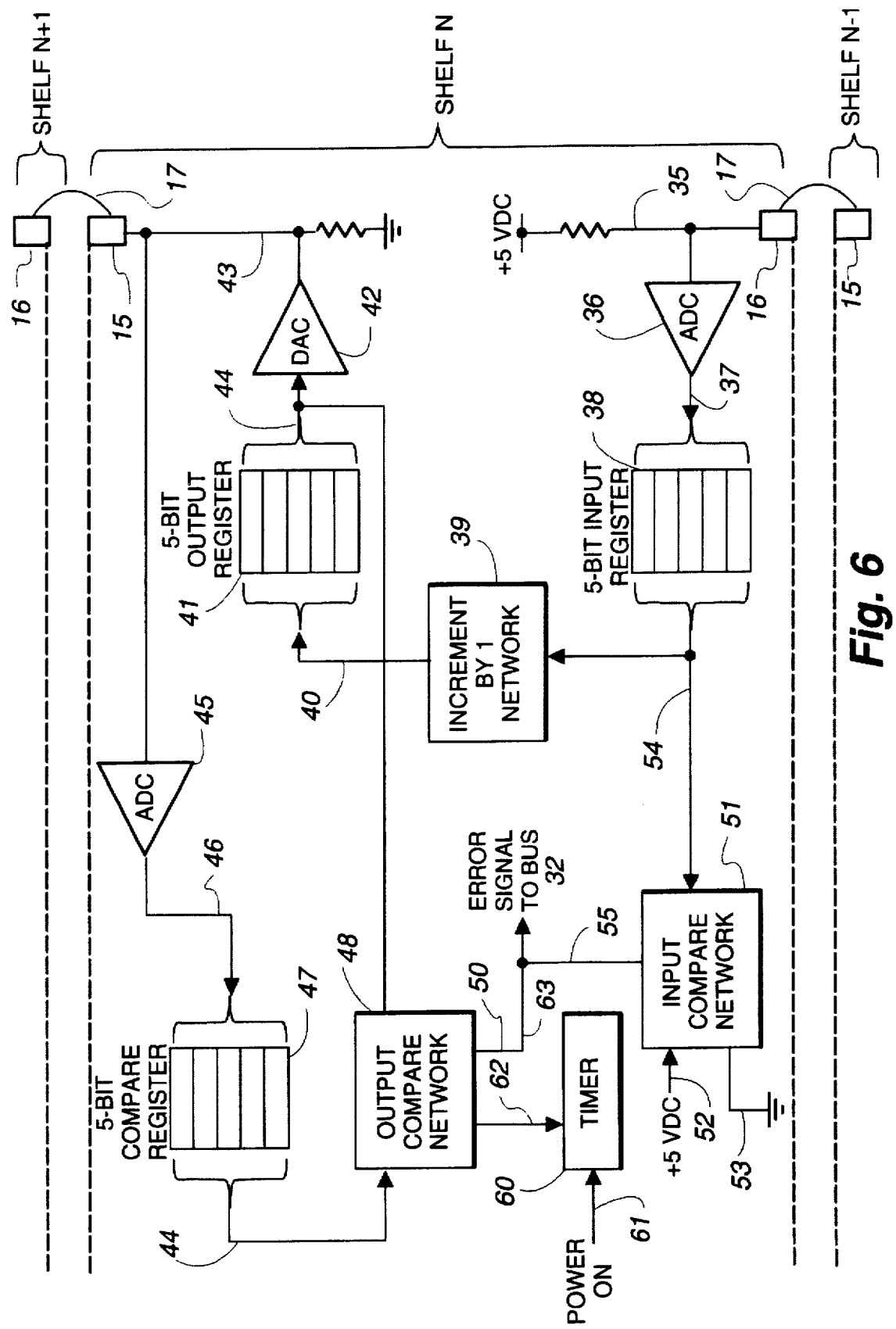
FIG. 6 is a schematic circuit diagram that shows the construction and arrangement of a shelf EMU for shelf "N" of FIG. 1.

FIG. 6 is a schematic diagram that shows the construction and arrangement of a shelf EMU 21 for shelf "N" of FIG. 1. As noted above, the various shelf EMUs 21 are of generally identical construction and arrangement insofar as implementation of the present apparatus/method invention is concerned. The various shelf EMUs 21 perform other functions that are not related to the present invention, and these additional functions will not be described herein. As is well known, the operation of EMUs 21 can be provided by a programmed microprocessor, by the interconnection of a number of discrete logic components, and/or by the use of an application-specific integrated circuit.

In FIG. 6, the input connector 16 and the output connector 15 of shelf "N" are shown connected to the next lower shelf "N−1" and to the next higher shelf "N+1" by way of two short-length cables 17, as was above described relative to FIG. 1.

In accordance with this invention, input connector 16 of shelf "N" is provided with an analog voltage 35 whose analog magnitude comprises the decimal equivalent of the following binary value;—(the binary address of shelf "N"−1) plus (a binary one). For example, assume that the shelf address of shelf "N−1" is decimal-5. The 5-bit binary address of shelf "N−1" is therefor "00101". As a result, shelf "N−1" provides and output voltage 35 to shelf "N" having an magnitude that is the equivalent of binary "00110". As will be apparent from the following description, the EMU 21 that is within shelf "N−1" has operated to ensure the magnitude of analog voltage 35 comprises the correct address for shelf "N".

An Analog-to-Digital Converter (ADC) 36 now operates to generate an digital analog voltage that is stored in 5-bit input register 38. The content of register 38 is the data processing address of shelf "N" that will be used when the disk drives 20 of shelf "N" are used in data processing operations. As stated, this operation can take many forms and will not be described herein.

The 5-bit binary number now stored in register 38 is now presented to a network 39 that operates to increment the binary stored content of register 38 by a binary-1. As a result, the data processing address of shelf "N" has been incremented by "1", and in this manner, the data processing address of shelf "N+1" has been generated on conductor 40. This next-shelf-address 40 is now stored in 5-bit output register 41 and is presented to bus or cable 44.

A Digital to Analog Converter (DAC) 42 now operates to convert this next-shelf-address 44 into an analog voltage 43 whose magnitude is representative of the magnitude of the binary number that comprises next-shelf-address 44. This analog next-shelf voltage 43 is now presented to input connector 16 of shelf "N+1".

In order to ensure that analog voltage 43 is of the correct "next shelf address" magnitude, and to thereby provide a correct binary data processing address for next shelf "N+1", analog voltage 43 is now presented as an input to ADC 45. The binary output 46 of ADC 45 is then stored in 5-bit output compare register 47. The stored content of register 47 should be the data processing address of next shelf "N+1".

In order to effect this error detection, a digital output compare network 48 it provided with a first input that comprises the 5-bit output 49 of compare register 47 and a second input that comprises the 5-bit output 44 of output register 41. So long as these two 5-bit binary values are of the same magnitude, no error signal 50 is reported to server 30 of FIG. 5 by way of bus 32. However, when the two binary values 44,49 are not of the same magnitude, this lack of compare is taken as a detection of the fact that the EMU 21 of shelf "N" has failed to generate the proper next-shelf-address for application to the input connector 16 of shelf "N+1".

While the above description has dealt with the use of 5-bit registers, it will be recognized that this detail of description is not to be taken as a limitation on the invention.

In its broader concept, the shelf EMUs 21 in accordance with the present invention operate to (1) accept a valid analog shelf address signal 35 from a prior shelf, (2) generate a digital shelf address signal 38 from the analog shelf address signal 35, (3) increment the shelf address signal 38 by "1", (4) generate an analog next-shelf-address signal 43 from the incremented signal, (5) apply this analog next-shelf-address signal 43 to the input 16 of the next shelf, (6) check to determine that the generated next-address-signal is of the correct magnitude, and (7) generate an error signal 50 when it is determined that an incorrect next-shelf-address signal 43 has been sent to the next shelf.

As an additional feature of the invention, an input compare network 51 is provided. Network 51 receives three binary inputs, i.e. a 5-VDC or binary "11111" input 52, a ground, zero-voltage or binary "00000" input 53, and the binary output 54 of 5-bit input register 38. The purpose of compare network 51 is to determine if the cable-17/connector 16 input to shelf "N" is either open-circuit or short-circuit. When a short circuit occurs, input analog voltage 35 is of a zero magnitude, and comparison network 51 provides an error output 55 to server 30 by way of bus 32. When an open circuit occurs, analog input voltage 55 is equal to 5-VDC, and comparison network again provides an error output 55 to server 30.

As an additional feature of the invention the above described operation of each shelf EMU 21 must be accomplished within a given time period, and if it is not, and error signal 50 is generated to server 30. In order to accomplish this end result, a 2-second timer 60 is provided. Timer 60 is set into operation upon the detection of a power-on-event 61 for cabinet 10 (or at a time shortly thereafter), and timer 60 is reset, that is its timing operation is interrupted, by a reset signal 62 that is generated by digital compare network 48 after network 48 has operated to compare signal 49 to signal 44. In the event that timer 60 times-out before reset signal 62 is generated, then timer 60 operates to generate an error signal 63 to conductor 50 of FIG. 6.

As is apparent from this description, since each inter-shelf cable 17 is used only to electrically attach two physically adjacent shelves, since the shelves are mounted into cabinet 10 from the bottom up, and since the logical shelf addresses are automatically assigned in this same bottom up sequential order, the physical shelf locations within cabinet 10 map directly into the logical shelf addressing that is used for data processing purposes.

As noted in relative to FIG. 1, the operation of the EMU 21 of each shelf within cabinet 10 is redundant in that each of the shelves 1 through M includes two set of identical output connector 15 interconnect cable 17, input connector 16 pairs that operate as described relative to FIG. 6.

FIG. 7 is a truth table that shows the operation of the FIG. 6 EMU 21. Entry 70 of this table represents the condition wherein the analog voltage 35 that is present on input cable 17 to shelf "N" is both greater-than 0 VDC and less-than 5 VDC; i.e., input voltage 35 is within a proper shelf-address analog voltage range. In addition, for condition 70 the output cable 17 that extends to shelf "N+1" contains an analog voltage level "N+1", and the 2-second timing interval of timer 60 has not expired. When all three of these conditions are present, cable 32 reports "OK" to server 30, thus indicating that a normal cabinet 10 power-on-event has occurred, that shelf "N" to shelf "N+1" interconnection is proper, that a valid shelf address has been provided to shelf "N", and that a valid next-shelf address has been generated for shelf "N+1".

In operation of the shelf-1 to shelf M configuration of FIG. 1 in accordance with this invention, as operation of the various shelf EMU's 21 progress from bottom shelf-1 to top shelf-M, all shelves that are above a currently active shelf report an invalid shelf address as being applied to the input terminal 15 of the upper shelves. For example, assume that EMU 21 of shelf-4 is currently operating in accordance with this invention, and that a valid next-shelf address has not as yet been applied to input terminal 15 of shelf-5. In this case, all of group of shelves shelf 5 through shelf-M will report receiving an invalid shelf address. However, as operation of the invention successfully progresses upward in the shelf-1 to shelf-M sequence, each shelf sequentially operates report a valid shelf address.

It is to be noted that occasionally it may be necessary to replace an EMU 21 that is within a shelf by a physically different but identical EMU 21. This event is called an EMU "hot swap". When this event occurs, all of the shelves that are below, and all of the shelves that are above this new-EMU shelf in the shelf sequence, will continue to report a valid shelf address. The EMU 21 for this new-EMU shelf now cycles or operates in accordance with the invention, a valid shelf address is thereby set for this new-EMU shelf, and a valid next-shelf address is generated for the shelf that is next in sequence to the new-EMU shelf.

Entry 71 of FIG. 7 shows the operation of the FIG. 6 EMU 21 for the condition where the analog voltage 35 that is present on input cable 17 to shelf "N" is again of a proper analog voltage shelf-address magnitude, indicated in FIG. 7 as "n". However, in this case, the shelf's output connector/ cable 115/17 that extends to the input connector 16 of shelf "N+1" contains an analog voltage that is not of the correct analog voltage level or magnitude "N+1". Again in table entry 71 the 2-second timing interval of timer 60 has not expired. When the three conditions of table entry 71 are present, cable 32 reports "ERROR" to server 30, thus indicating that a fault exists in that shelf's EMU 21, that the address of next shelf "N+1" was not properly generated by shelf "N", or that an fault exits in the output connector/cable 15/17 of shelf "N".

Entries 72 and 73 of FIG. 7 are for the two fault conditions open input cable/connector 17/16 and shorted input cable/ connector 17/16, respectively. In both of these conditions, and after the 2-second timing interval of timer 60 has expired, an "ERROR" message is sent to server 30 by way of bus or cable 32. The error message of table entries 72.73 both operate to indicate that the EMU 21 of shelf "N" is bad, that the previous shelf "N−1" did not provide a next-shelf-address to shelf "N" that was within the proper analog range "n", or that the input cable/connector 17/16 of shelf "N" is bad.

Figure 8:
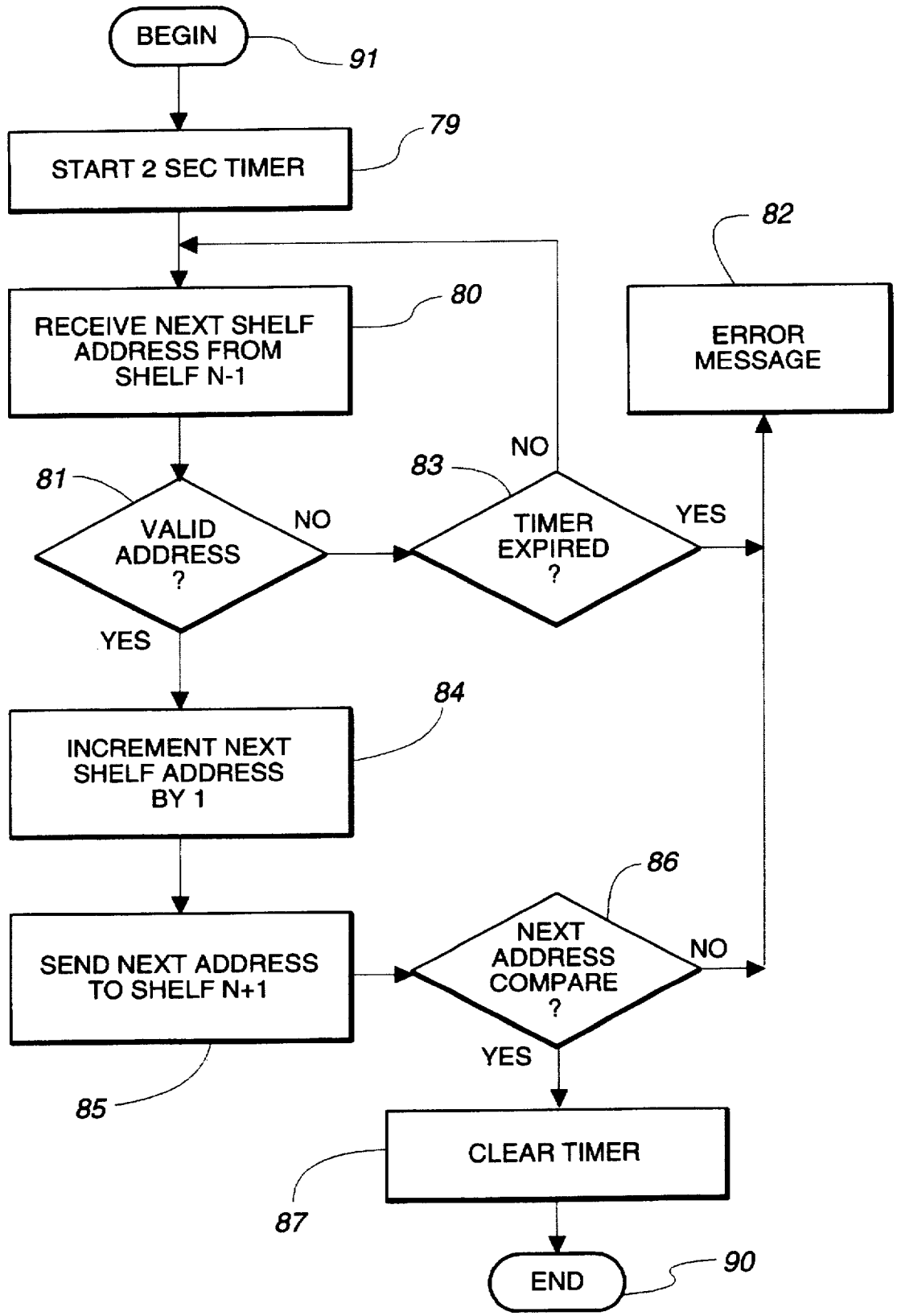
FIG. 8 is a showing of the operation of the FIG. 6 EMU in flowchart form.

FIG. 8 is a showing of the operation of the FIG. 6 the EMU 21 that is within an active shelf in flowchart form.

The first step in this process is function 79 at which 2-second timer 60 of FIG. 6 is set; i.e., the timer begins timing or counting from zero.

Step 80 in this process is a function whereat a next-shelf address of shelf "N" is received from shelf "N−1", this being analog voltage 35 of FIG. 6. At decision function 81, input compare network 51 of FIG. 6 checks to determine if this received next shelf address 80 is valid. If not, an error message is generated at function 82, but only after the 2-second timing period of timer 60 has expired as is indicated by the "yes" output of decision function 83.

If the next shelf address 80 is valid, then increment-by-one network 39 of FIG. 6 operates to increase the binary value of the address of 20 shelf "N" by one, as is shown at function 84. This incremented binary shelf address magnitude is then applied as an analog voltage 43 to the input connector 16 of the next shelf, i.e. to the input of shelf "N+1", as is shown at function 85.

EMU 21 of shelf "N" now operates as shown by three entries 71,72,73 of FIG. 7 to ensure that a number of errors have not occurred.

The next address checking function is indicated in FIG. 8 at decision function 86.

The first of the conditions to be checked involves the use of FIG. 6's compare network 48 to ensure that the incremented binary value 40 is the same as the binary output 46 of ADC 45, i.e. decision function 86. Namely, was the address received by shelf "N" properly increased to a value that is equal to the address of shelf "N+1"?

The second and third conditions to be checked relate to factors that include the operative condition of the cable/ connector that transmits the next shelf address to shelf "N+1". If as a result of a short circuit or an open circuit in this cable/connector arrangement, the binary output 46 of ADC 45 will not properly compare to the binary output 40 of increment network 39.

If any of these fault conditions exist, an error message 82 is provided by the "no" output of decision function 86. A "yes" output from decision function 86 enables function 87 to clear timer 60 (note that timer 60 has not timed out at this time), and then ends the FIG. 8 process.

However, the FIG. 8 process now repeats at shelf "N+1", etc. In this case, end function 90 of FIG. 8 for the above described shelf-"N" reenters FIG. 8 by way of begin function 91 for operation of the EMU 21 that is within shelf "N+1".

Note that at any time during the operation of, and before the completion of, the FIG. 8 process, if timer 60 times out, then the "yes" output of decision function 83 operates to generate error message 82.

Timer 60 thus provides a time-supervisor feature of this invention. The FIG. 8 function 79 operates to set 2-second timer 60 into operation. Decision function 83 operates to continuously monitor the state of timer 60, looking for time-out of the timer. If a time-out occurs at any time during operation of the FIG. 8 process, the "yes" output of decision function 83 operates to generate error message 82. If no error is detected by FIG. 8's decision function 83, then function 87 operates to reset timer 60 to zero by virtue of the "yes" output of decision function 86.

The above description of preferred embodiments of the invention has of necessity dealt with specific details of apparatus/method construction and arrangement, such as the use of 5-bit binary numbers, and the incrementing of a present shelf address by the value 1 in order to generate a next shelf address. The above details of construction, of which these two examples are but nonlimiting examples, are not however to be taken as a limitation on the spirit and scope of this invention.

What is claimed is:

1. Apparatus for automatically providing a different data processing shelf address to each one of a plurality of shelves that are contained in a sequential physical order within a cabinet of a data processing system, said plurality of shelves including a shelf N, a shelf N−1 that is physically located immediately adjacent to shelf N and on a downstream side of shelf N, and a shelf N+1 that is physically located immediately adjacent to shelf N and on an upstream side of shelf N, comprising:

a shelf address output-terminal within shelf N−1 electrically connected to a shelf address input-terminal within shelf N by way of a first electrical connection;

said shelf N−1 output-terminal providing a next-shelf address voltage of a given magnitude to said input-terminal of shelf N;

magnitude incrementing circuitry within shelf N operable to increase said given magnitude of said next-shelf address voltage to a higher magnitude that comprises an address for shelf N+1, and a shelf address output-terminal within shelf N electrically connected to a shelf address input-terminal within shelf N+1 by way of a second electrical connection;

said shelf N output-terminal providing said higher magnitude next-shelf shelf address voltage to said input-terminal within shelf N+1.

2. The apparatus of claim 1 including:

a supervisor timer having a timing interval;

said supervisory timer being set in operation upon said shelf N−1 output-terminal receiving a next-shelf address voltage of a given magnitude to said input-terminal of shelf N; and said supervisory timer being reset upon said shelf N output-terminal providing said higher magnitude next-shelf shelf address voltage to said input-terminal within shelf N+1.

3. The apparatus of claim 2 including redundant said first and second electrical connections.

4. The apparatus of claim 1 wherein said given magnitude of said next-shelf address voltage is normally within a valid-magnitude-range that is greater than a zero-magnitude and is less than an upper-limit magnitude, and wherein said shelf-N includes:

first comparing circuitry operable to compare said given magnitude of said next-shelf address voltage received by shelf N to said valid-magnitude-range.

5. The apparatus of claim 4 wherein said shelf N includes:

second comparing circuitry operable to compare said higher magnitude next-shelf address voltage produced by said magnitude incrementing circuitry to said higher magnitude shelf address voltage applied to said input-terminal within shelf N+1 in order to determine that they are of the same magnitude.

6. The apparatus of claim 5 including:

fault-indicating circuitry connected to said first comparing circuitry and to said second comparing circuitry;

said fault-indicating circuitry operating to indicate a fault whenever it is determined that said next-shelf voltage received by shelf N is not within said valid-magnitude-range, and whenever it is determined that said higher magnitude shelf address voltage applied to said input-terminal within shelf N+1 is not of the same magnitude as said higher magnitude next-shelf address voltage produced by said magnitude incrementing circuitry.

7. The apparatus of claim 6 including:

third comparing circuitry operable to check said higher magnitude shelf address voltage applied to said input-terminal within shelf N+1 to determine that said higher magnitude shelf address voltage is within said valid-magnitude-range;

said fault-indicating circuitry additionally operating to indicate a fault whenever it is determined that said higher magnitude shelf address voltage is not within said valid-magnitude-range.

8. The apparatus of claim 7 including:

a redundant pair of said first and second electrical connections.

9. The apparatus of claim 8 including:

a supervisor timer having a fixed timing interval;

said supervisory timer being set in operation upon said shelf N−1 output-terminal receiving a next-shelf address voltage of a given magnitude to said input-terminal of shelf N;

said supervisory timer being reset upon said shelf N output-terminal providing said higher magnitude next-shelf shelf address voltage to said input-terminal within shelf N+1; and said fault-indicating circuitry additionally operating to indicate a fault whenever it is determined that said supervisory timer has reached the end of said fixed timing interval.

10. The apparatus of claim 1 wherein:

said shelf address output-terminal within shelf N−1 and said shelf address input-terminal within shelf N are physically spaced by a given distance;

said shelf address output-terminal within shelf N and said shelf input-terminal within shelf N+1 are physically spaced by said given distance; and said first and second electrical connections are of an operative length that is generally equal to said given distance.

11. A method for automatically providing a different data processing shelf address to each one of a plurality of physically ordered shelves that are contained within a cabinet of a data processing system, said plurality of shelves including a shelf N, a shelf N−1 that is physically located immediately adjacent to shelf N and on one side of shelf N, and a shelf N+1 that is physically located immediately adjacent to shelf N and on an opposite side of shelf N, comprising the steps of:

provinding a shelf address output-terminal within shelf N−1;

providing a shelf address input-terminal within shelf N;

interconnecting said shelf address output-terminal within shelf N−1 to said shelf address input-terminal within shelf N by way of a first electrical conductor;

said shelf N−1 output-terminal providing a next-shelf address voltage of a given magnitude to said input-terminal of shelf N;

providing magnitude incrementing circuitry within shelf N operable to increase said given magnitude of said next-shelf address voltage to a higher magnitude that comprises an address of shelf N+1;

providing a shelf address output-terminal within shelf N;

providing an shelf address input-terminal within shelf N+1; and electrically connecting said shelf address output-terminal within shelf N to said shelf address input-terminal within shelf N+1 by way of a second electrical conductor to thereby provide said higher magnitude next-shelf shelf address voltage to said input-terminal within shelf N+1.

12. The method of claim 11 including the step of:

providing a redundant pair of said first and second electrical conductors.

13. The method of claim 11 wherein said given magnitude of said next-shelf address voltage is normally within a valid-magnitude-range that is greater than a zero-magnitude and is less than an upper-limit magnitude, and including the step of:

providing first comparing circuitry within shelf N operable to compare said given magnitude of said next-shelf address voltage received by shelf N to said valid-magnitude-range.

14. The method of claim 13 including the step of:

providing second comparing circuitry operable to compare said higher magnitude next-shelf address voltage produced by said magnitude incrementing circuitry to said higher magnitude shelf address voltage applied to said input-terminal within shelf N+1 in order to determine that they are of the same magnitude.

15. The method of claim 14 including the step of:

providing fault-indicating circuitry connected to said first comparing circuitry and to said second comparing circuitry;

said fault-indicating circuitry operating to indicate a fault whenever it is determined that said next-shelf voltage received by shelf N is not within said valid-magnitude-range, and whenever it is determined that said higher magnitude shelf address voltage applied to said input-terminal within shelf N+1 is not of the same magnitude as said higher magnitude next-shelf address voltage produced by said magnitude incrementing circuitry.

16. The method of claim 15 including the step of:

providing third comparing circuitry operable to check said higher magnitude shelf address voltage applied to said input-terminal within shelf N+1 to determine that said higher magnitude shelf address voltage is within said valid-magnitude-range;

said fault-indicating circuitry additionally operating to indicate a fault whenever it is determined that said higher magnitude shelf address voltage is not within said valid-magnitude-range.

17. The method of claim 16 including the steps of:

providing a supervisory timer that is operable to time-out at the end of a fixed timing interval, and starting said supervisory timer when said next-shelf address voltage of a given magnitude is applied to said input-terminal of said shelf N;

said fixed timing interval normally being longer than the a time interval that is necessary to complete said method;

said fault-indicating circuitry additionally operating to indicate a fault whenever it is determined that said supervisory timer has timed out.

18. Apparatus for automatically assigning data processing addresses to each of the integer quantity M of physically individual shelves that are within a cabinet, said M shelves being arranged in a sequential order from a first shelf-1 to a last shelf M, said sequential order providing intermediate shelves comprising shelf-2 through shelf M−1, each of said shelves having:

an input-terminal adapted to receive a next-shelf address signal having an address-indicative magnitude;

an output terminal adapted to transmit a next-shelf address signal having an address-indicative magnitude;

a magnitude increasing network operable to step-increase the magnitude of a received next-shelf address signal to a higher magnitude, thereby generating a higher magnitude next-shelf address signal that is applied to said output-terminal;

said apparatus including;

a first quantity M of electrical cables, a voltage source providing a next-shelf address signal having a low magnitude that comprises a data processing address for said shelf-1, a first of said electrical cables operating to connect said voltage source to said input-terminal of said shelf-1, the quantity M−2 of said electrical cables operating to individually connect said output-terminals to said input-terminals of said shelf-2 through said shelf M−1; and a last of said electrical cables operating to connect said output-terminal of said shelf M−1 to said input-terminal of said shelf-M.

19. The apparatus of claim 18 including a second quantity M of electrical cables connected to provide M redundant electrical connections for said first quantity M of electrical cables.

20. The apparatus of claim 18 wherein:

said next-shelf address signals comprise DC signals;

said voltage source provides a next-shelf address signal having a low DC magnitude to said input-terminal of said shelf-1;

said input-terminals of said shelf-2 through shelf M individually receive next-shelf address signals of progressively greater DC magnitudes progressing from said shelf-1 through said shelf-M−1;

said shelf-M receives a highest magnitude DC next-shelf address signal;

said magnitude range from said low magnitude DC to said highest magnitude DC comprising a critical magnitude range; and each of said shelves further including;

first comparing circuitry operable to compare the magnitude of a said next-shelf address signal that is received by a said shelf to said critical magnitude range in order to determine if said received next-shelf address signal is valid.

21. The apparatus of claim 20 wherein each of said shelves further includes:

second comparing circuitry operable to compare (1) the magnitude of a said next-shelf signal produced by said magnitude increasing circuitry, to (2) the magnitude of a said next-shelf address voltage applied to said output terminal, in order to determine that they are of the same magnitude.

22. The apparatus of claim 21 wherein each of said shelves further includes:

fault-indicating circuitry connected to said first comparing circuitry and to said second comparing circuitry; and said fault-indicating circuitry operating to indicate a fault whenever it is determined that the magnitude of a said next-shelf signal produced by said magnitude increasing circuitry is not the same as the magnitude of a said next-shelf address voltage applied to said output terminal.

23. The apparatus of claim 22 wherein each of said shelves further includes:

third comparing circuitry operable to check a said next-shelf address signal received by said input-terminal to determine if the magnitude of said received next-shelf signal is within said critical-magnitude-range; and said fault-indicating circuitry additionally operating to indicate a fault whenever it is determined that said magnitude of said received next-shelf signal voltage is not within said critical-magnitude-range.

24. The apparatus of claim 23 including:

a supervisor timer having a fixed time-out interval;

said supervisory timer being controlled to begin timing said fixed time-out interval upon said input-terminal receiving a said next-shelf address signal;

said supervisory timer being controlled to stop timing said fixed time-out interval upon said output terminal transmitting a said next-shelf address signal; and said fault-indicating circuitry additionally operating to indicate a fault whenever it is determined that said supervisory timer has timer out.

25. The apparatus of claim 24 wherein:

said output-terminal of each of said shelves and said input-terminal of an immediately adjacent upstream one of said shelves are physically spaced by a given distance; and said first quantity of electrical cables are individually of an operative length that is generally equal to said given distance.

26. Apparatus for automatically providing a progressively higher magnitude analog-DC shelf-address voltage to each one of a plurality of shelves that are contained in a sequential number order within a cabinet of a data processing system, said plurality of shelves including a shelf N, a shelf-N−1 that is physically located immediately adjacent to said shelf-N and on one side of said shelf-N, and a shelf-N+1 that is physically located immediately adjacent to said shelf-N and on an opposite side of said shelf-N, said apparatus comprising:

an output-terminal of said shelf-N−1 electrically connected to an input-terminal of said shelf-N by way of a first electrical cable;

said shelf-N−1 output-terminal providing a first analog-DC shelf address voltage to said input-terminal of said shelf-N;

a first analog-to-digital converter of shelf-N operable to convert said first analog-DC voltage to a first multi-bit binary number;

magnitude increasing circuitry of shelf-N operable to increase said first multi-bit binary number by a fixed binary quantity, thereby generating a first shelf-address binary number that corresponds to an address for shelf N+1;

a digital-to-analog converter operable to convert said first shelf-address binary number of a second analog-DC shelf address voltage;

an electrical connection of said shelf-N connecting said second analog-DC shelf address voltage to said output-terminal of said shelf-N; and a second electrical cable connecting said output-terminal of said shelf-N to said input-terminal of said shelf-N+1.

27. The apparatus of claim 26 wherein said first and second analog-DC shelf address voltages, when they are of a valid magnitude, are within a magnitude-range that is greater than a zero-magnitude and is less than an upper-limit magnitude, and wherein said shelf-N includes:

first digital comparing circuitry operable to compare (1) said first multi-bit binary number, to (2) a binary magnitude range that corresponds to said valid magnitude range.

28. The apparatus of claim 27 wherein said shelf-N includes:

a second analog-to-digital converter connected to said output-terminal of said shelf-N;

said second analog-to-digital converter being operable to convert said second analog-DC shelf address voltage to a second multi-bit binary number;

second digital comparing circuitry operable to compare (1) said second multi-bit binary number, to (2) said increased first multi-bit binary number, in order to determine that they have the same binary magnitude.

29. The apparatus of claim 28 wherein said shelf-N includes:

fault-indicating circuitry connected to said first digital comparing circuitry and to said second digital comparing circuitry;

said fault-indicating circuitry operating to indicate a fault whenever it is determined that (1) said first multi-bit binary number is not within said binary magnitude range that corresponds to said valid magnitude range, or (2) said second multi-bit binary number and said increased first multi-bit binary number are not of the same binary magnitude.

30. The apparatus of claim 29 wherein said shelf-N includes:

third digital comparing circuitry operable compare (1) said second multi-bit binary number, to (2) said binary magnitude range that corresponds to said valid magnitude range;

said fault-indicating circuitry additionally operating to indicate a fault whenever it is determined that said second multi-bit binary number is not within said valid-magnitude-range.

31. The apparatus of claim 30 including:

a timer having a timing interval, and operable to generate an output at the end of said timing interval;

means operable to enable said timer to being timing when said first analog-DC shelf address voltage is applied to said input-terminal of said shelf-N;

means operable to stop said timer when said second analog-DC shelf address voltage is applied to said output-terminal of said shelf-N; and said fault-indicating circuitry additionally operating to indicate a fault whenever it is determined that said output of said timer has been generated.

32. The apparatus of claim 31 wherein:

said output-terminal of shelf-N–1 and said input-terminal of shelf-N are separated by a given distance;

said output-terminal of said shelf-N and said input-terminal of said shelf-N+1 are separated by said given distance; and said first and second electrical cables are of an operative length that is generally equal to said given distance.

* * * * *